United States Patent [19]
Audenaert et al.

[11] Patent Number: 5,340,879
[45] Date of Patent: Aug. 23, 1994

[54] POLYMER RESINS AND USE THEREOF

[75] Inventors: Raymond Audenaert, Hamme, Belgium; Stephan Kirchmeyer, Leverkusen; Kirkor Sirinyan, Bergisch Gladbach, both of Fed. Rep. of Germany; Wolfgang Henning, Amagasaki, Japan

[73] Assignees: Bayer Aktiengesellschaft, Leverkusen, Fed. Rep. of Germany; Bayer Antwerpen N.V., Antwerpen, Belgium

[21] Appl. No.: 30,809

[22] Filed: Mar. 12, 1993

[30] Foreign Application Priority Data

Mar. 19, 1992 [DE] Fed. Rep. of Germany ....... 4208793

[51] Int. Cl.$^5$ .................................................. C08F 8/20
[52] U.S. Cl. ................... 525/327.4; 525/327.6; 525/327.7; 525/329.6; 525/356; 525/367; 525/368; 525/369; 525/370; 525/371; 525/333.7
[58] Field of Search ............... 525/327.4, 327.6, 327.7, 525/329.6, 333.7

[56] References Cited

U.S. PATENT DOCUMENTS

| | | | |
|---|---|---|---|
| 3,579,485 | 5/1971 | Folzenlogen et al. | 260/78.4 D |
| 4,486,575 | 12/1984 | Newman et al. | 525/356 |
| 4,501,859 | 2/1985 | Newman et al. | 525/356 |
| 5,043,375 | 8/1991 | Henning et al. | 524/372 |

FOREIGN PATENT DOCUMENTS

| | | |
|---|---|---|
| 2011862 | 9/1990 | Canada . |
| 325861 | 8/1989 | European Pat. Off. . |
| 1-256556 | 10/1989 | Japan . |
| 9012056 | 10/1990 | PCT Int'l Appl. . |

OTHER PUBLICATIONS

Patent Abstract of Japan vol. 11, No. 30 (C-400)(2477) Jan. 29, 1987 & JP-A-61 200 112 (Mitsubishi Yuka Fine Chem Co. Ltd) Sep. 4, 1986.

*Primary Examiner*—Bernard Lipman
*Attorney, Agent, or Firm*—Joseph C. Gil; Thomas W. Roy

[57] ABSTRACT

The invention relates to polymer resins which are dispersible or soluble in water, wherein the resin is an amorphous, chlorinated, chemically modified copolymer or terpolymer prepared from polyethylene, polybutene and/or polypropylene and having an amorphous polypropylene content of at least 50% by weight, an average molecular weight Mw of 10,000 to 100,000 g/mol, a non-uniformity of 1.0 to 6.5, a chlorine content of 2.5 to 50% by weight, an anionic or cationic salt group content of 5 to 250 milliequivalents per 100 g of polymer resin and a content of polyoxyalkylene units of 0 to 40% by weight, the proportion of oxyethylene units being at least 30% by weight of the oxyalkylene units.

6 Claims, No Drawings

POLYMER RESINS AND USE THEREOF

BACKGROUND OF THE INVENTION

1. Field of the Invention

The invention relates to polymer resins dispersible or soluble in water, and use thereof as coating compounds, adhesive and film-formers for glass fiber sizes.

DESCRIPTION OF THE PRIOR ART

In German laid-open specifications 3,909,217 and 3,939,760, it is recommended to use lacquers additionally containing a primer based on halogen-containing chemically modified amorphous polyolefins with functional groups for direct lacquering of injection-molded plastic parts. These lacquer systems contain organic solvents in proportions of 40 to 80% by weight. However, aqueous dispersions or solutions not containing organic solvents would be very advantageous and desirable for ecological reasons. Either, exclusively aqueous dispersions or solutions can be used for sizing glass fibers.

Aqueous dispersions based on polyolefins are known. They are mainly produced by emulsion polymerization. It is also known to use dispersions based on chlorinated polyolefins as an aid in lacquering injection-molded plastic parts (DE 3,910,901) or as waterbased adhesives (EP-A 0325861). The polymers on which the dispersions are based are conventional polyolefins applied as primers to injection-molded plastic parts. These systems have the disadvantage of being substantially incompatible with conventional polar binders and additives such as polyurethanes (PUR), acrylates, polyesters, polyethers or silanes, and therefore cannot be applied directly in combination with these binders and additives. In addition, the high content of crystalline polymer impairs the flow properties.

An object of the present invention is to provide polymer resins which have good adhesion to the substrate, excellent compatibility with high polar binders and additives, and excellent flow properties (film formation), and are also readily dispersible or soluble in water.

These objects may be achieved by the polymer resins according to the invention.

SUMMARY OF THE INVENTION

In the following all data relating to the molecular weight of the products of the invention or of the starting materials for their manufacture relate to the weight average molecular weight Mw as determined by gel permeation chromatography using polystyrene as standard.

The invention relates to polymer resins which are dispersible or soluble in water, wherein the resin is an amorphous, chlorinated, chemically modified copolymer or terpolymer prepared from polyethylene, polybutene and/or polypropylene and having an amorphous polypropylene content of at least 50% by weight, an average molecular weight of 10,000 to 100,000 g/mol, a non-uniformity of 1.0 to 6.5, a chlorine content of 2.5 to 50% by weight, an anionic or cationic salt group content of 5 to 250 milliequivalents per 100 g of polymer resin and a content of polyoxyalkylene units of 0 to 40% by weight, the proportion of oxyethylene units being at least 30% by weight of the oxyalkylene units.

DETAILED DESCRIPTION OF THE INVENTION

Non-uniformity is defined as $M_w \div M_n$, wherein $M_w$ is the weight average molecular weight of the polymer and $M_n$ is the number average molecular weight of the polymer.

Preferably, the polymer resins have an average molecular weight Mw of 15,000 to 80,000, preferably 15,000 to 60,000 g/mol; a non-uniformity of 1.5 to 4.5; a chlorine content of 15 to 40% by weight, preferably 20 to 35% by weight; an anionic or cationic salt group content of 20 to 120 milliequivalents per 100 g of polymer resin; and a content of polyoxyalkylene units of 0 to 30 wt %, the proportion of oxyethylene units being at least 30% by weight.

The polymer resins according to the invention are dispersible or soluble in water and are used in this form for their various applications. Preferably, other additives are added to the dispersions or solutions.

The proportions of the polymer resins according to the invention in the aqueous dispersion or solution is preferably 5 to 70% by weight, more preferably 20 to 50% by weight.

The aqueous dispersions or solutions according to the invention are used as coating compounds, primers (e.g. for coating polyolefins), adhesives or film-formers for glass fiber sizes.

Examples of suitable anionic salt groups include carboxylic acids, sulphonic acid or phosphonic acid groups neutralized with based, e.g., ammonia, sodium or potassium hydroxide or amines such as triethylamine or dimethyl ethanolamine. Also suitable are cyanourea groups, neutralized, e.g., with based obtained by the reaction of isocyanate groups with cyanoamide.

The cationic groups are preferably ammonium groups which may be obtained by the reaction of tertiary amine groups with acids such as acetic acid, lactic acid, dibutyl phosphate or hydrochloric acid.

The anionic or cationic salt groups are present in the polymer resin in an amount of 5 to 250, preferably 20 to 120 milliequivalents per 100 g of polymer resin. The polymer resin can also contain 0 to 40, preferably 0 to 20% by weight of oxyalkylene units in the form of polyoxyalkylene. Polyoxyalkylenes include polyethylene glycols or polyoxyethylene/poly-1,2-oxypropylene block copolyethers which are bonded to the polymer resin by suitable cross-linking reactions. The proportion by weight of oxyethylene units in the polyoxyalkylene is at least 30%.

In addition to the salt groups or polyoxyalkylenes, other nitrogen, oxygen, sulphur and/or silicon-containing functional groups can be present in the polymer resin, so as to bring about or at least improve compatibility between the polymer resins and conventional polar additives or binders and other additives. These functional groups can also advantageously influence the physical fixing of the polymer resins in the binder matrix or on the surface of the reinforcing fibers.

Examples of suitable functional groups include carboxylic acid anhydride, carboxylic acid ester, carboxylic acid amide, biscarboxylic acid imide, aldehyde, ketone, sulphonic acid ester, hydroxy, hydroperoxide or alkoxysilane groups; heterocyclic groups such as imidazole, carbazole or pyridinyl groups; groups containing activated double bonds such as vinyl sulphonyl or vinyl amino groups; and mercapto groups. Preferred functional groups include hydroxyl, hydroperoxy (H—O—O—), carboxyl, carboxylic acid anhydride, carboxylic acid amide, biscarboxylic acid imide, carboxylic acid ester, amino and alkoxysilane groups, more preferably trimethoxy or triethyoxy silane groups.

The starting materials for producing the aqueous dispersion or solution according to the invention are amorphous copolymers or terpolymers based on ethylene, butene and/or propylene which have a propylene content of at least 50% by weight, an average molecular weight Mw of 10,000 to 120,000 g/mol and a non-uniformity of 1.0 to 7.5. The starting materials can be amorphous copolymers of propylene with other olefinically unsaturated monomers such as ethylene, isoprene or butadiene having the required molecular weight and non-uniformity ranges. The comonomers for producing the aforementioned copolymers of propylene are used in proportions of 3 to 50% by weight, based on the total weight of these monomers.

Chlorine is introduced in known manner by chlorinating the amorphous polyolefins used as starting material (Houben-Weyl, "Methoden der organischen Chemie", Volume V/3, pages 511–551, Georg Thieme Verlag, Stuttgart 1962). The polymer resins according to the invention are produced by chlorination at temperatures between about $-10°$ C. and the boiling point of the solvent used.

The functional groups can be incorporated by reaction with conventional peroxides (incorporation of hydroperoxide or carboxyl groups) or by radically initiated grafting reactions with monomers containing the functional groups according to the invention. The initiators can be the known peroxides or azo compounds. The modification reactions are known and are described, e.g., in the following literature references: G. A. Russel, *J. Am. Chem. Soc.*, 79 (1957) 3871; M. Irving et al, *Polymer Degradation and Stability* 5 (1983) 467; N. G. Gaylord, *J. Polym. Sci. Polym. Lett. Ed.*, 21 (1983) 23–30; A. Neyishi et al, *J. Appl. Polym. Sci.*, 22 (1978) 2953); and A. Hoff, *J. Appl. Polym. Sci.*, 29 (1984) 465.

Examples of suitable initiators include potassium peroxodisulphate, azo-bis-isobutyronitrile, t-butyl perbenzoate, t-amyl-perneodecanoate, p-benzodines, t-butyl perisononanoate, di-2-ethyl hexyl peroxdicarbonate and di-n-butyl peroxydicarbonate.

Examples of suitable monomers having functional groups include acrylic acid; methacrylic acid; itaconic acid; vinyl sulphonic acid; vinyl phosphonic acid; allyl amine; allyl alcohol; trimethoxy vinyl silane; triethyoxy vinyl silane; ethyl allyl ether; cyclohexene-1-dicarboxylic acid anhydride-4; maleic acid anhydride; maleic acid dimethyl or diethyl, dipropyl or dibutyl ester or acid amides thereof such as maleic acid diethyl amide, etc.; n-alkyl maleic acid imides such as n-propyl maleic imide or n-butyl maleic acid imide; fumaric acid; fumaric acid dimethyl, diethyl, dipropyl or dibutyl esters, or acid imides or amides thereof; 3-trimethoxysilyl-1-chloropropane; n-[2-(trimethoxysilyl)-ethyl]ethylene diamine; 3-trimethoxysilyl-1-chloropropane; mercaptopropyl or mercaptobutyl trimethoxy or triethyoxy silane; vinylene carbonate; vinyl sulphone; 3-trimethoxysilyl propyl-1-imidazole; and carbazole. Monomers are generally suitable if they do not react with polyolefins to form block copolymers.

Functional groups may alternatively be incorporated in the melt by using extruders or other conventional high-viscosity mixers at temperatures of about 140° to 300° C., but preferably at temperatures above the melting range of the polyolefins used (G. M. Gale *Appl.* *Organomet. Chem.*, 2 (1988) 17–31), or in a suitable solvent (DE 1,546,982). Functional groups are incorporated in solution by a grafting reaction, preferably at elevated temperatures between about 40° C. and the boiling point of the solvent. Xylene, carbon tetrachloride, toluene, chlorobenzene, tetraline, cresol and mixtures thereof are examples of suitable solvents.

The sequence of the reactions (chlorination and incorporation of functional groups) is not critical.

The incorporated functional groups can also be chemically modified after the grafting reaction. The modification reactions preferably bring about or increase the dispersibility of the polymer resin. For example, the modification reactions can incorporate salt groups, or polyoxyalkylene blocks can be chemically bonded to the polymer resin. This is particularly advantageous when reactive groups such as dicarboxylic acid anhydride groups or epoxy groups can be easily introduced by a grafting reaction without large quantities of homopolymer being formed. Neutralization of acids or amino groups and nuceleophilic opening of cyclic dicarboxylic acid anhydrides with bases such as amines or hydroxyl ions is particularly preferred. The modification reactions can optionally be brought about after introducing the functional groups or after the dispersion step. Preferably, the functional groups are modified after they have been incorporated and chlorination is complete.

Additives can be added to the aqueous dispersion or solution of the polymer resin according to the invention to prevent the dispersed polymer particles from coagulating by rendering the polymer resin dispersible or by increasing the stability of the dispersion. The additives include anionic, cationic or nonionic low molecular, oligomeric or polymeric emulsifiers, tensides or protective colloids. They are present in an amount of 1 to 35% by weight, preferably 0.5 to 30% by weight, based on the weight of the amorphous polyolefin in the aqueous polymer dispersions.

Examples of anionic low molecular weight oligomeric or polymeric emulsifiers and tensides include alkali metal or alkaline earth metal salts of fatty acids such as sodium salts of saturated fatty acids having 10 to 21 carbon atoms and sodium salts of unsaturated fatty acids having 12 to 18 carbon atoms; chlorosulphonated and saponified paraffin oils; alkyl ether sulphonates such as ethers of α-sulpho-ω-hydroxypolyethylene glycols, e.g., with 1-methyl phenyl ethyl phenol, nonyl phenol or alkyl ethers with 12 to 18 carbon atoms; aryl alkyl sulphonates such as naphthalene sulphonic acids containing straight chain or branched butyl groups; and alkyl sulphates such as the sodium salts of long chain sulphuric acid alkyl esters.

Examples of cationic low molecular oligomeric or polymeric emulsifiers and tensides include salts of amines having long chain alkylene radicals with 8 to 22 carbon atoms which are reacted with acids or alkylated to obtain the ammonium compounds. Also suitable are analogous phosphorus and sulfur compounds.

Examples of nonionic oligomeric or polymeric emulsifiers and tensides include alkyl polyglycol ethers or esters of ethoxylated long-chain alcohols containing saturated or unsaturated bonds and, e.g., 12 to 18 carbon atoms; ethoxylated castor oil, ethoxylated (coconut oil) fatty acids; ethoxylated soybean oil; ethoxylated resinic or rosinic acids; ethoxylated or optionally propoxylated butyl diglycol; ethoxylated alkyl aryl ethers such as ethoxylated straight-chain and/or branched nonyl phenol or octyl phenol; and benzylated p-hydroxy biphenyl.

Additional emulsifiers and tensides include ethoxylated long chain alkyl or alkenyl amines; lecithin; reaction products of polyethylene glycols and diisocyanates modified with longchain alkyl isocyanates; reaction products of rapeseed oil and diethanolamine; and ethoxylated reaction products of sorbitan and long-chain alkane or alkene carboxylic acids.

Suitable additives include "protective colloids" such as polyvinyl alcohols and water soluble cellulose derivatives such as methyl cellulose.

The aqueous dispersions or solutions of polymer resins according to the invention are made in known manner by dissolving the polymer resin in a solvent, such as acetone, tetrahydrofuran or toluene, and subsequently adding water and removing the solvent, or by applying high shear forces, e.g., using the Ultra-Turrax agitator with nozzles or dissolver discs. The polymer resin content of the aqueous dispersion or solution is preferably 5 to 70% by weight, more preferably 20 to 50% by weight.

The aqueous dispersions or solvents according to the invention can be used as coating compounds, e.g., as additives in the formulation of aqueous coating compositions for coating polypropylene, or an an additive, e.g. for bonding substrates of polypropylene, or as film-formers for glass fiber sizes.

The invention is further illustrated but is not intended to be limited by the following examples in which all parts and percentages are by weight unless otherwise specified.

EXAMPLES

Production of a modified polymer 100 g of an amorphous terpolymer based on propylene, ethylene and butene (weight ratio 60/10/30) having a molecular weight Mw of 64,800, a non-uniformity of 4,0 and an intrinsic viscosity of 0,49 dl/g (available from Hüls AG) were dissolved in 2000 g of carbon tetrachloride, and 48 g of pure chlorine were then introduced into the solution during a period of 90 minutes with continuous UV irradiation. Next, 40 g of $Na_2CO_3$ were added to the polymer solution, agitated for 30 minutes and removed by subsequent filtration of NaCl and excess $Na_2CO_3$. 9.8 (0.1 mol) of maleic acid anhydride were added to the solution, after which 1.2 g tert. butyl perbenzoate in 50 ml of $CCl_4$ at 70° C. were added dropwise to the solution for an hour under $N_2$ and the solution was cooled to about 20° C.

The modified polymer was then precipitated with 5000 g of ethanol, washed twice with ethanol and dried overnight. The resulting modified polymer had an average molecular weight Mw of about 60,000 g/mol and contained 24.0% by weight of chlorine and 4.8% by weight of oxygen.

EXAMPLE 1

Production of a polymer resin according to the invention and a dispersion according to the invention.

130 g of the above-modified polymer was dissolved in 390 ml of tetrahydrofuran with gentle heating. 6.7 g of triethylamine and 4.5 g of a 25% ammonia solution were added and agitated for 1 hour. The polymer resin contained 51 milliequivalents of anionic salt groups per 100 g resin. After the addition of 32.5 g of a polyether alcohol prepared by adding 7 moles of ethylene oxide to one mol nonyl-phenol the mixture was dispersed in 520 ml of water. The tetrahydrofuran was distilled off at a pressure of 20 mbar and at a temperature of 30° C. The resulting low-viscosity stable dispersion contained 25% by weight of solids.

EXAMPLE 2

Production of a polymer resin according to the invention and a dispersion according to the invention.

130 g of the above-modified polymer were dissolved in 390 ml tetrahydrofuran with gentle heating. 5.9 g of N,N-dimethyl ethanolamine and 4.5 g of a 25% ammonia solution were added and agitated for 1 hour. The polymer resin contained 50 milliequivalents of anionic salt groups per 100 g of resin. 32.5 g of a polyetheralcohol obtained by adding 9 moles of ethylene oxide to one mol nonylphenol were added and dispersed in 520 ml of water. The tetrahydrofuran was distilled off at a pressure of 20 mbar and a temperature of 30° C. The resulting low-viscosity stable dispersion contained 25% by weight of solids.

EXAMPLE 3

A commercial polypropylene panel (Hostalen 8018 of Hoechst AG) measuring 100×100 mm and modified with EPDM rubber was discharged by blowing with ionized air, freed from dust particles and then coated with a primer by spraying.

The primer contained a mixture of

| | |
|---|---|
| 30 parts by weight | of the aqueous 1K-PUR binder described in DE-A 3,936,794, Example A, |
| 30 parts by weight | of the dispersion in Example 1, |
| 20 parts by weight | of titanium dioxide pigment (rutile), |
| 12 parts by weight | of talc, |
| 4.8 parts by weight | of black pigment (carbon black), and |
| 5.2 parts by weight | of a 10% solution in acetone of a commercial anti-setting agent (Bentone 38, available from Kronos Titan GmbH, D-5090 Leverkusen). |

After the primer was applied, the plate was dried at room temperature for 30 minutes and then at 70° C. in a drying oven for 30 minutes.

The resulting coating had an adhesion of Gt 0 in accordance with DIN 53 157.

EXAMPLE 4

A glass fiber sizing was made from a mixture of

| | |
|---|---|
| 92.4 parts by weight | of water, |
| 6 parts by weight | of a dispersion as per Example 1, |
| 0.3 parts by weight | of γ-glycidoxypropyl trimethoxy silane, |
| 0.8 parts by weight | of γ-aminopropyl triethyoxy silane, |
| 0.3 parts by weight | of a fatty acid amide (Sapamin AL, available from Ciba-Geigy) and |
| 0.2 parts by weight | of lithium chloride. |

The sizing agent was applied to glass fibers, 10 μm in diameter, using a kiss roll applicator. The glass fibers were wound into cakes (bobbins) and then dried at 130° C. for 10 hours. After drying, the glass fibers were cut into chips 4.5 mm long. The resulting glass fibers were very suitable as a reinforcing and filling material for incorporation into polypropylene.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer resin which is dispersible or soluble in water and comprises an amorphous, chlorinated, chemically modified terpolymer prepared from a monomer mixture containing ethylene, butene and propylene, wherein the total amount of ethylene and butene is 3 to 50% by weight, based on the total weight of said monomer mixture, said polymer resin having an average molecular weight Mw of 10,000 to 100,000 g/mol, a non-uniformity of 1.0 to 6.5, a chlorine content of 2.5 to 50% by weight, an anionic or cationic salt group content of 5 to 250 milliequivalents per 100 g of polymer resin and a content of polyoxyalkylene units of 0 to 40% by weight, the proportion of oxyethylene units being at least 30% by weight of the oxyalkylene units.

2. The polymer resin of claim 1 wherein said terpolymer has an average molecular weight Mw of 15,000 to 80,000 g/mol, a non-uniformity of 1.5 to 4.5, a chlorine content of 15 to 40% by weight, an anionic or cationic salt group content of 20 to 120 milliequivalents per 100 g of polymer resin and a content of polyoxyalkylene units of 0 to 20% by weight.

3. The polymer resin of claim 2 wherein said terpolymer has a chlorine content of 20 to 35% by weight.

4. An aqueous dispersion or solution which contains a polymer resin which comprises an amorphous, chlorinated, chemically modified terpolymer prepared from a monomer mixture containing ethylene, butene and propylene, wherein the total amount of ethylene and butene is 3 to 50% by weight, based on the total weight of said monomer mixture, said polymer resin having an average molecular weight Mw of 10,000 to 100,000 g/mol, a non-uniformity of 1.0 to 6.5, a chlorine content of 2.5 to 50% by weight, an anionic or cationic salt group content of 5 to 250 milliequivalents per 100 g of polymer resin and a content of polyoxyalkylene units of 0 to 40% by weight, the proportion of oxyethylene units being at least 30% by weight of the oxyalkylene units.

5. The aqueous dispersion or solution of claim 4 wherein said terpolymer has an average molecular weight Mw of 15,000 to 80,000 g/mol, a non-uniformity of 1.5 to 4.5, a chlorine content of 15 to 40% by weight, an anionic or cationic salt group content of 20 to 120 milliequivalents per 100 g of polymer resin and a content of polyoxyalkylene units of 0 to 20% by weight.

6. The aqueous dispersion or solution of claim 5 wherein said terpolymer has a chlorine content of 20 to 35% by weight.

* * * * *